UNITED STATES PATENT OFFICE.

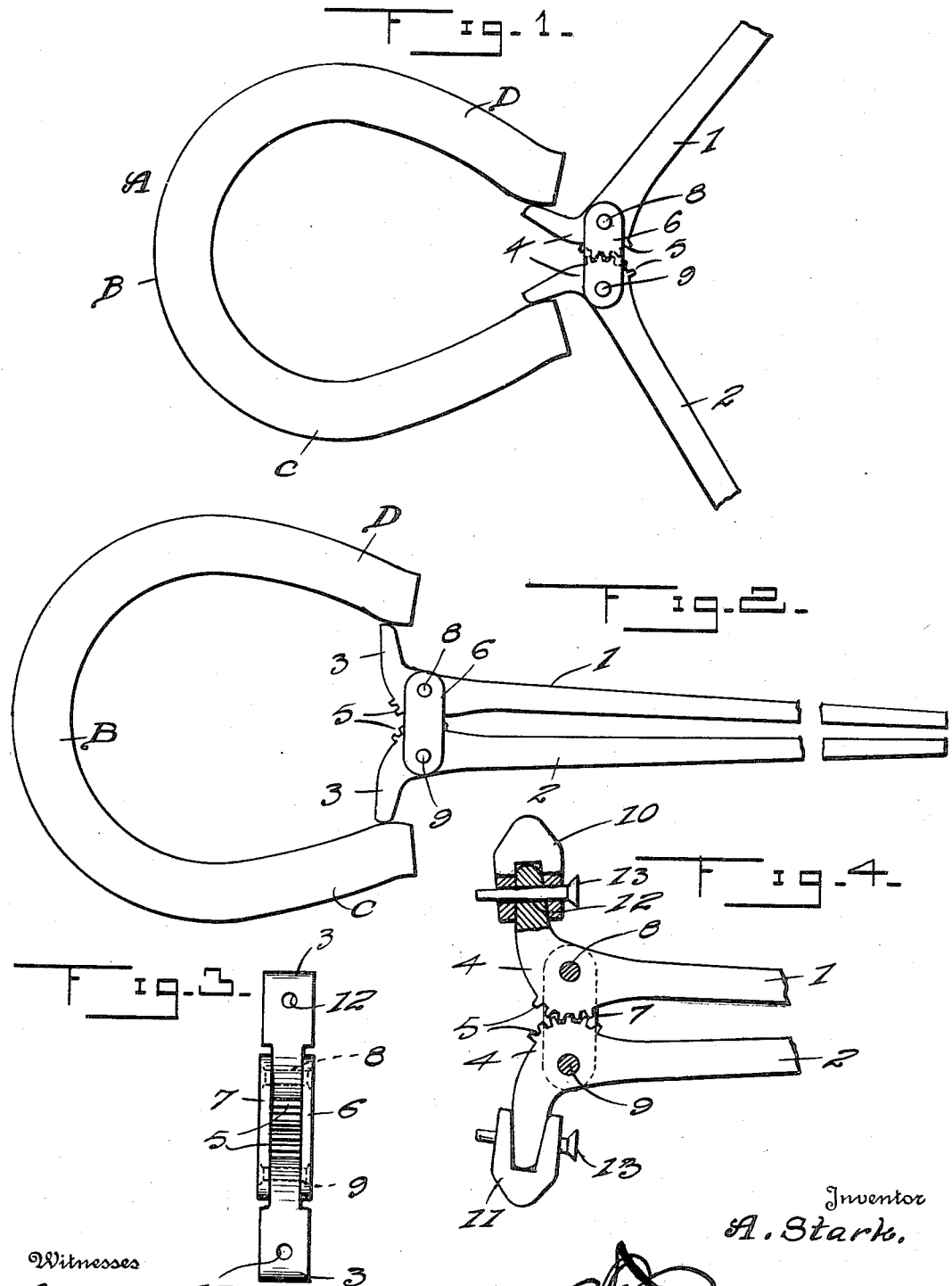

ADONIJAH STARK, OF JOPLIN, MISSOURI.

HORSESHOE-SPREADER.

1,155,288.

Specification of Letters Patent.

Patented Sept. 28, 1915.

Application filed July 3, 1915. Serial No. 38,010.

*To all whom it may concern:*

Be it known that I, ADONIJAH STARK, a citizen of the United States, residing at Joplin, in the county of Jasper and State of Missouri, have invented certain new and useful Improvements in Horseshoe-Spreaders; and I do hereby declare the following to be a full, clear, and exact description of the invention, such as will enable others skilled in the art to which it appertains to make and use the same.

The general object of the invention is to admit of the operation of spreading the sides of a horseshoe, after the shoe has been nailed to the hoof of a horse, to be effected by one person; also a device that can be manufactured cheaply, will be simple in construction, can be expeditiously applied to the horseshoe, and conveniently operated.

To these ends the invention consists in the provision of a pair of pivotally connected companion handle members, each having an angularly extending terminal adapted to provide a shoe engaging portion, the said angular terminals extending in opposite directions and adapted to be moved toward each other when the handles are moved away from each other, and to be moved away from each other when the handles are again brought together.

Other objects will appear and be better understood from that embodiment of my invention of which the following is a specification, reference being had to the accompanying drawings, forming a part thereof, in which:—

Figure 1 is a view of the device in position to be applied to the horseshoe. Fig. 2 is a view of the device after the spreading operation, and still applied to the shoe. Fig. 3 is an end view of the shoe engaging end of the spreader. Fig. 4 is a detail side elevation of the spreader showing the hoof engaging portions provided with removable caps.

Referring to the drawings more in detail, the letter A designates the horseshoe of ordinary construction, having the toe portion B and sides C and D.

The improved shoe spreader comprises a pair of companion handle members 1 and 2, coextensive in length and adapted to lie substantially in parallel relation, when not in use. Each handle has one terminal bent and extended outwardly to provide an angular portion 3, the said angular portions being adapted to form shoe engaging portions, as shown in Figs. 1 and 2 of the drawings. Each handle member 1, is provided, at its point of juncture with the laterally extending portion 3, with an enlarged arcuate portion 4. Each of these arcuate portions 4 is provided with a series of spaced teeth 5, the said teeth on the arcuate portions of the handles being adapted to interfit with each other, as shown in Fig. 4, when the handles are in assembled position.

The handle members are connected with each other by means of link members 6 and 7. These members are arranged in opposite sides of the handles and at the enlarged arcuate portion 4 and are pivoted to the arcuate portions by means of pivot pins 8 and 9.

The shoe engaging portions 3 are of a width greater than the width of the handle members 1 and 2, so as to provide a relatively wide shoe engaging surface. In the operation, it will be seen that when the handle members 1 and 2 are moved away from each other, the shoe engaging portions 3—3 will be brought in close relation with each other, as shown in Fig. 1. The shoe engaging portions 3 are then placed in engagement with the inner surfaces of the heel portions of the shoe as shown in Fig. 1, and pressure is then exerted on the handle members 1 and 2 so as to force them in the direction of each other, the shoe engaging portions 3—3 being forced away from each other and the spreading of the heel portions of the shoe farther from each other as shown in Fig. 2 of the drawings.

If it is desired to force the heel portions of the shoe a greater distance from each other, than usual, removable caps 10 and 11 are employed. Each of these caps is substantially U-shaped and is adapted to fit over one of the shoe engaging portions, as shown in Fig. 4 of the drawings, the said U-shaped caps 10—11 having thin sides provided with apertures adapted to aline with apertures 12 in the shoe engaging portion 3, so as to accommodate nails 13 or other suitable fastening elements that serve to hold the caps 10—11 on the shoe engaging portions 3.

With a device constructed in the manner above described, it will be seen that one man can readily, by the use of one hand, apply the spreader to the shoe and force the sides of the shoe to the position, shown in Fig. 2 of the drawings.

Having thus described my invention, what I claim as new is:—

1. A horseshoe spreader comprising, a pair of handle members, shoe engaging portions formed on the handle members, teeth formed on the handle members and below the shoe engaging members, and adapted to interengage with each other, and means for pivotally connecting the handles to each other.

2. A horseshoe spreader comprising a pair of handle members, shoe engaging portions formed on the handle members, means for pivotally connecting the handles to each other, and removable caps associated with the said shoe engaging portion.

3. A horseshoe spreader comprising a pair of handle members, shoe-engaging portions formed on the handle members, means for pivotally connecting the handles to each other, caps removably associated with the shoe-engaging portions, and means extending through the caps and the shoe-engaging portions for holding the caps in position.

In testimony whereof I affix my signature in presence of two witnesses.

ADONIJAH STARK.

Witnesses:
OLLIE M. TAPPANA,
BESSIE CARLSON.